United States Patent
McDonald et al.

(10) Patent No.: US 8,518,148 B2
(45) Date of Patent: Aug. 27, 2013

(54) INTEGRATED FLUE GAS DEHUMIDIFICATION AND WET COOLING TOWER SYSTEM

(75) Inventors: Dennis K. McDonald, Massillon, OH (US); Douglas J. DeVault, Rootstown, OH (US); Paul J. Williams, Akron, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 13/178,576

(22) Filed: Jul. 8, 2011

(65) Prior Publication Data
US 2012/0042779 A1 Feb. 23, 2012

Related U.S. Application Data

(60) Provisional application No. 61/363,299, filed on Jul. 12, 2010.

(51) Int. Cl.
*B01D 47/00* (2006.01)

(52) U.S. Cl.
USPC ........ 95/36; 95/229; 95/231; 95/235; 95/236; 96/242; 96/266

(58) Field of Classification Search
USPC .......................................... 95/231; 423/210
See application file for complete search history.

(56) References Cited

U.S. PATENT DOCUMENTS

| | | |
|---|---|---|
| 3,927,176 A | 12/1975 | Turnbo et al. |
| 4,933,162 A | 6/1990 | Vansant et al. |
| 5,001,095 A | 3/1991 | Sechrist |
| 7,585,476 B2 | 9/2009 | Downs et al. |
| 7,993,615 B1 * | 8/2011 | McDonald et al. ........... 423/210 |

FOREIGN PATENT DOCUMENTS

| | | |
|---|---|---|
| EP | 1148196 A1 | 10/2001 |
| WO | 2006022885 A1 | 3/2006 |
| WO | 2007068733 A1 | 6/2007 |

\* cited by examiner

*Primary Examiner* — Duane Smith
*Assistant Examiner* — Joubert X Glover
(74) *Attorney, Agent, or Firm* — Eric Marich; Michael J. Seymour; Christopher L. Smith

(57) ABSTRACT

A method and system for dehumidifying flue gas from a flue gas-generating process that supplies the flue gas to a wet flue gas processor. A wet cooling tower supplies water to a wet flue gas processor to condense water from the flue gas and form a liquid mixture in the wet flue gas processor.

19 Claims, 1 Drawing Sheet

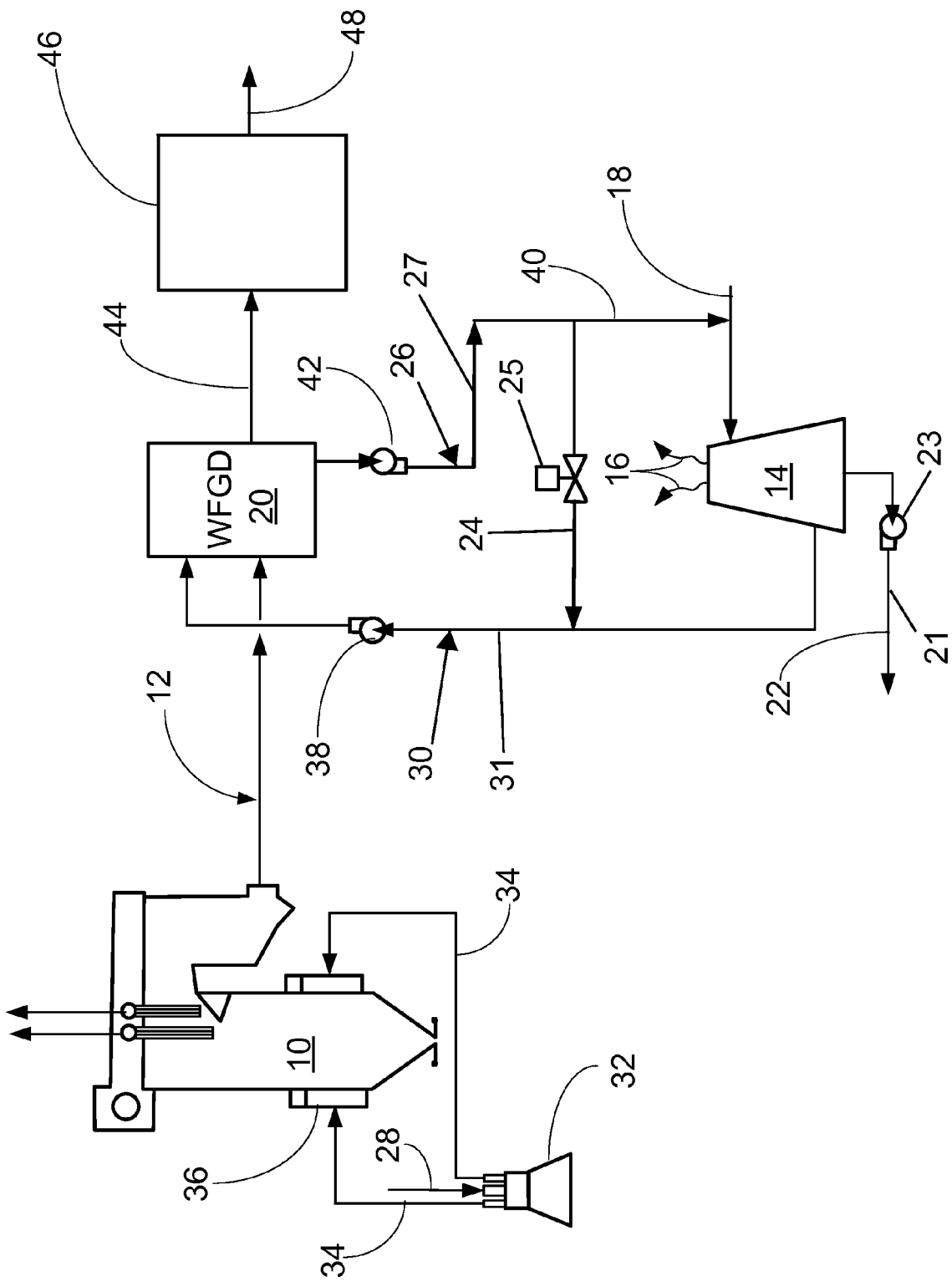

INTEGRATED FLUE GAS DEHUMIDIFICATION AND WET COOLING TOWER SYSTEM

This application claims the benefit of U.S. Provisional Application No. 61/363,299 filed Jul. 12, 2010. U.S. Provisional Application No. 61/363,299 filed Jul. 12, 2010 is incorporated herein by reference in its entirety.

FIELD AND BACKGROUND OF THE INVENTION

The present invention relates generally to the field of flue gas treatment for boilers, and in particular to a new and useful method and apparatus for more efficient wet cooling of boiler exhaust gases, and more particularly to providing cooling water for dehumidification of boiler flue gasses even in areas where water is scarce.

In order to remove moisture from flue gas, for example for oxycombustion, regenerable solvent advanced technology (RSAT™) scrubber, or other carbonaceous fuel burning or flue gas treatment process, one method is to use quench cooling and to control the spray water temperature to achieve the desired outlet gas saturation temperature. One such method is taught in U.S. Pat. No. 7,585,476 but this concept could be applied to any method that cools flue gas to remove a constituent such as water by controlling the saturation temperature. U.S. Pat. No. 7,585,476 is incorporated herein by reference In current approaches, a cooling tower is used to cool the water used within a quench cooler cooling surface. It is known in the industry that wet evaporative cooling is less costly and more effective than dry cooling, but it requires a significant amount of water which is evaporated to dissipate the heat removed from the cooling water. The present invention takes advantage of the water condensed from the flue gas within the quench cooler by using it in the wet cooling tower as make-up for evaporation.

Prior art solutions have also been limited in that they require a cooling coil in the wet flue gas desulfurization scrubber ("WFGD"). One such solution is taught in U.S. patent application Ser. No. 12/830,850, which is herein incorporated by reference.

SUMMARY OF THE INVENTION

It is an object of the present invention to provide a method and system for dehumidifying flue gas from a flue gas-generating process that supplies the flue gas to a wet flue gas processor.

A wet cooling tower supplies water to the wet flue gas processor to condense water from the flue gas and form a liquid mixture in the wet flue gas processor.

The invention provides a more effective, i.e. lower cost and higher performance, dehumidification system than currently possible and eliminates the need for significant fresh water while permitting more efficient and less costly wet-cooling to be used in conjunction with flue gas dehumidification by quench-cooling. This invention is applicable in contexts where flue gas dehumidification is needed and in one embodiment enhances current oxy-combustion and in another embodiment advances post-combustion $CO_2$ technology.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the drawing:

FIG. 1 is a schematic representation of the direct flue gas dehumidification and wet cooling tower system according to the present invention.

DESCRIPTION OF THE PREFERRED EMBODIMENTS

Referring now to the FIG. 1, this illustration shows a system for dehumidifying flue gases 12 from a boiler 10, that uses much less water than was previously needed. The invention, in fact, almost eliminates the need for fresh water make-up to a wet cooling tower (WCT) 14. A large amount of make-up water would otherwise be needed and supplied into the system at water line 18. By implementing the present invention, only make-up water for water losses or water that is used to purge solids at purge outlet 22 through line 21 via pump 23, is needed. This permits wet evaporative cooling to be used, even in climates where water is scarce. The present invention also accomplishes this without using a closed loop cooling system with a cooling coil located in the WFGD or quench tower 20. Because the source of the water is the combustion of the fuel (primarily natural gas or coal), only a very small amount of fresh water make-up is required at water line 18.

One example of how the boiler 10 is fueled is by coal supplied at 28 to a pulverizer 32 and, once pulverized, by feed lines 34 to burners 36 of the boiler 10. For an oxy-combustion boiler, $CO_2$-rich flue gas can be recirculated to the boiler and supplied along with oxygen rich gas to burn the fuel in the boiler 10.

In some combustion processes such as oxy-combustion and postcombustion systems, moisture must be removed from the flue gas 12 before sending it to further processing, such as in a compression unit. In oxy-combustion it is also advantageous to remove moisture from some or all of the flue gas that is recycled to improve combustion in the boiler 10. This function can be accomplished by controlling the gas temperature leaving a wet scrubber such as a WFGD or controlling the water temperature in a quench type cooler. The WFGD or the quench-type cooler is schematically shown at 20 in FIG. 1 and is generically referred to herein as a wet flue gas processor. In either case, the objective is to control the flue gas temperature leaving the flue gas generating device, which flue gas will be saturated, and thus control the moisture content in the flue gas.

In prior art methods, to control the flue gas temperature, water or, in a wet scrubber, slurry which may also remove other constituents, is cooled by a heat exchanger to the desired temperature before spraying into the flue gas stream.

As shown in FIG. 1, the present invention takes advantage of the water condensed from the flue gas within the quench cooler by using it in the wet cooling tower as make-up for evaporation. Thus, the present invention is an improvement on the prior art in that it does not require a cooling coil in the WFGD but ties the WFGD directly to the wet cooling tower.

In embodiments of the present invention, cool water or slurry 30 from a wet cooling tower 14 is pumped through line 31 directly into the spray headers within the quench cooling tower or WFGD 20. The cool water or slurry is sprayed into the gas stream 12 reducing the gas temperature to approximately the same temperature as the cool water or slurry 30.

The temperature of the cool water or slurry 30 is controlled by bypassing through line 24 via valve 25 some of the warm water or slurry 26 in line 27 around the WCT 14 and mixing it with the cool water or slurry 30 to achieve the desired temperature. Suitable means for supplying and/or returning any one of water, liquid, and/or a liquid mixture include, but are not limited to, piping, conduit, and any other transport device known to one skilled in the art.

The cool water or slurry 30 absorbs heat from the incoming flue gas 12 to the desired saturated temperature, resulting in condensation of moisture from the flue gas 12. The water or slurry 30 along with the condensed water from the flue gas 12 is pumped to the wet cooling tower 14 where it is cooled by evaporative cooling 16 before recirculating.

The amount of water condensed in the quench cooler or WFGD 20 is determined by how much the adiabatic saturation temperature is reduced. The amount of heat that must be removed to achieve the reduced temperature is the latent heat of vaporization plus the sensible heat in the gas. Thus, the amount of water condensed from the flue gas in the quench cooler or WFGD 20 defines the temperature of the cool water or slurry 30 sprayed into the flue gas 12 and the circulation rate is determined by the quantity of cool water or slurry 30 required to absorb the heat to reduce the gas temperature to the same temperature as the cool water or slurry 30. That temperature is set by the desired amount of condensation since the flue gas leaving the device will be saturated.

Since the heat absorbed in the quench cooler or WFGD 20 is theoretically exactly the same amount of heat that must be removed in the wet cooling tower 14 to return the water or slurry to its cooled temperature, the amount of water condensed in the quench cooler or WFGD 20 is also theoretically equal to the amount of water that will be evaporated 16 in the wet cooling tower. By pumping the water condensed in the quench cooler or WFGD 20 to the WCT 14, the water condensed in the quench cooler or WFGD 20 would evaporate in the WCT 14 and in theory no additional fresh water would be required. Since there is likely to be some solid in the stream the WCT 14 will require a purge 22 to control solids concentration. To compensate for the purge stream and any losses, some fresh water make-up will be needed but much less than would otherwise be necessary.

In embodiments of the invention in which the system employs a quench cooler 20 using water, the solids will be negligible and the fresh make-up very low.

In embodiments wherein a WFGD 20 is used, the amount of wet cooling tower purge 22 will depend upon the reagent being used. In addition, with a WFGD 20, raw slurry must be added to control the pH (and removal of targeted constituent such as $SO_2$) in the WFGD 20. It is likely that the pH returning to the WCT will be alkaline, so some additives will be necessary in the WCT to control biological growth resulting in a slightly acidic stream returning to the WFGD. This factor will slightly increase the raw slurry 30 requirement for the WFGD, adding some operating cost. However, compared to prior art systems having a cooling coil, the present direct system eliminates the cost and power consumption of one large recirculating pump.

In embodiments of the present invention, the slurry or water at 30 is pumped by pump 38 to the top of the WFGD or quench cooler 20 and sprayed into the incoming gas from flue gas line 12 and collected in the bottom of the WFGD 20.

The amount of water condensed in the WFGD or quench cooler 20 is determined by how much the adiabatic saturation temperature is reduced. The amount of heat that must be removed to achieve the reduced temperature is the latent heat of vaporization plus the sensible heat in the flue gas 12. Thus, the amount of water condensed from the flue gas 12 in the WFGD or quench cooler 20 defines the amount of heat that must be removed from the flue gas 12 to achieve that degree of condensation. Likewise, the amount of heat that must be removed from the cooling water in the wet cooling tower defines the amount of water evaporated at 16 to achieve that degree of cooling. Since the heat being absorbed in the WFGD or quench cooler 20 is essentially exactly the same amount of heat being removed in the wet cooling tower 14, the amount of water condensed on line 40 from the WFGD or quench cooler 20, will be essentially equal to the amount of water that will be evaporated at 16 in the wet cooling tower 14. By pumping the water by pump 42 on line 40 condensed in the WFGD or quench cooler 20 to the fresh water make-up line 18 for the WCT 14, no additional fresh water would be required, ideally. Since there are likely to be some solids in the stream, the WCT 14 will require a water containing purge 22 to control solids concentration. To compensate for the purge stream and any other possible water losses such as by evaporation at 16, some fresh water make-up will likely be introduced at water line 18 but much less than would otherwise be necessary.

Dehumidified flue gas leaves flue gas processor 20 on line 44 and is supplied to a downstream unit 46 that may be a $CO_2$ compression and purification unit (CPU) if the boiler 10 is operated as an oxy-combustion boiler, or a post combustion $CO_2$ capture unit, and then is supplied on line 48 to EOR or storage.

While a specific embodiment of the invention has been shown and described in detail to illustrate the application of the principles of the invention, it will be understood that the invention may be embodied otherwise without departing from such principles.

What is claimed is:

1. A method for dehumidifying flue gas from a flue gas-generating process, comprising:
   providing a wet flue gas processor;
   supplying the flue gas from the flue gas generating process to the wet flue gas processor;
   providing a wet cooling tower connected to the wet flue gas processor;
   supplying water from the wet cooling tower to the wet flue gas processor to fluidically mix the water with the flue gas to condense water from the flue gas, whereby a liquid mixture is formed in the wet flue gas processor, the liquid mixture comprising the condensed water from the flue gas and the water from the wet cooling tower; and
   supplying the liquid mixture from the wet flue gas processor as make-up water to the wet cooling tower; and
   cooling the liquid mixture in the wet cooling tower;
   wherein the water from the wet cooling tower passes through the flue gas as the flue gas is being supplied to the wet flue gas processor, reducing the temperature of the flue gas to substantially the same temperature as the temperature of the water;
   wherein the water absorbs heat from the flue gas to achieve a desired saturation temperature, resulting in condensation of moisture from the flue gas; and
   wherein the temperature of the cool water delivered from the wet cooling tower is modified by diverting a portion of the warm liquid mixture coming from the wet flue gas processor and mixing it with the cool water delivered from the wet cooling tower to achieve a desired temperature of the water delivered from the wet cooling tower.

2. The method of claim 1, wherein the flue gas generating process comprises the combustion of carbonaceous material in a boiler.

3. The method of claim 1, wherein the flue gas generating process comprises the oxy-combustion of carbonaceous material in a boiler.

4. The method of claim 1, wherein the liquid mixture in the wet flue gas processor is a slurry containing solids, the method including purging solids that reach the wet cooling tower from the wet flue gas processor with some of the water from the wet cooling tower and adding make-up water to the wet cooling tower to replace the water purged with the solids.

5. The method of claim 1, including pumping the water at least one of to-and-from the wet cooling tower, and from-and-to the wet flue gas processor, respectively.

6. The method of claim 1, wherein the liquid mixture in the wet flue gas processor is a slurry.

7. The method of claim 1, wherein the liquid in the wet flue gas processor is a slurry containing solids, the method including purging solids that reach the wet cooling tower from the wet flue gas processor from the wet cooling tower with some of the water from the wet cooling tower, and adding make-up water to the wet cooling tower to replace the water purged with the solids.

8. The method of claim 1, wherein the wet flue gas processor is a wet flue gas desulfurization unit.

9. The method of claim 1, wherein the means for diverting a portion of the liquid mixture coming from the wet flue gas processor away from the wet cooling tower is controlled by a valve.

10. The method of claim 1, wherein the wet flue gas processor is a quench cooler.

11. The method of claim 1, including removing an amount of heat from the wet cooling tower by evaporating water from the wet cooling tower.

12. The method of claim 1, including supplying dehumidified flue gas for the wet flue gas processor to a downstream unit for one of: CO2 compression and purification for oxy-combustion and post combustion CO2 capture.

13. A system for dehumidifying flue gas from a flue gas generating process, comprising:

a wet flue gas processor for receiving flue gas from the flue gas generating process;

a wet cooling tower connected to the wet flue gas processor;

means for supplying water from the wet cooling tower to the wet flue gas processor to fluidically mix the water with the flue gas to condense water from the flue gas and into the wet flue gas processor;

means for returning the water from the wet flue gas processor to the wet cooling tower for cooling the water in the wet cooling tower before it is returned to the wet flue gas processor; and means for supplying a liquid mixture with the condensed water from the wet flue gas processor to the wet cooling tower.

14. The system of claim 13, further comprising a bypassing means for diverting a portion of the liquid mixture away from the wet cooling tower.

15. The system of claim 13, further comprising a carbonaceous material burning boiler connected to the wet flue gas processor and for generating the flue gas.

16. The system of claim 13, wherein the flue gas generating process comprises the oxy-combustion boiler.

17. The system of claim 13, wherein the liquid in the wet flue gas processor is a slurry containing solids and including means for purging the solids from the wet cooling tower with some of the water from the wet cooling tower and adding make-up water to the wet cooling tower to replace the water purged with the solids.

18. The system of claim 13, including a pump for pumping the water at least one of to-and-from the wet cooling tower, and respectively from-and-to the wet flue gas processor.

19. The system of claim 14, wherein the means for diverting a portion of the liquid mixture coming from the wet flue gas processor away from the wet cooling tower is controlled by a valve.

* * * * *